(12) United States Patent
Bapst et al.

(10) Patent No.: US 6,327,650 B1
(45) Date of Patent: Dec. 4, 2001

(54) PIPELINED MULTIPROCESSING WITH UPSTREAM PROCESSOR CONCURRENTLY WRITING TO LOCAL REGISTER AND TO REGISTER OF DOWNSTREAM PROCESSOR

(75) Inventors: Mark V. Bapst, South Barrington, IL (US); Andrew P. Taussig, Mesa, AZ (US)

(73) Assignee: VSLI Technology, Inc., San Jose, CA (US)

( * ) Notice: Subject to any disclaimer, the term of this patent is extended or adjusted under 35 U.S.C. 154(b) by 0 days.

(21) Appl. No.: 09/248,777

(22) Filed: Feb. 12, 1999

(51) Int. Cl.⁷ ........................................................ G06F 9/00
(52) U.S. Cl. .......................... 712/228; 712/229; 709/108
(58) Field of Search .................... 707/203; 709/200–201, 709/208, 211–219, 229, 248, 108; 711/111–114, 117–118, 141; 712/28, 30–32, 220, 225, 228, 229

(56) References Cited

U.S. PATENT DOCUMENTS

| | | | |
|---|---|---|---|
| 5,448,705 | * | 9/1995 | Nguyen et al. ....................... 712/244 |
| 5,493,687 | * | 2/1996 | Garg et al. .............................. 712/23 |
| 5,696,923 | * | 12/1997 | Robertson et al. ................... 711/202 |
| 5,740,461 | * | 4/1998 | Jaggar ..................................... 712/41 |
| 5,878,256 | * | 3/1999 | Bealkowski et al. ................ 395/712 |
| 6,038,370 | * | 3/2000 | Ogikubo .................................. 386/96 |
| 6,101,599 | * | 8/2000 | Wright ................................. 712/228 |
| 6,145,049 | * | 11/2000 | Wong .................................... 710/267 |

* cited by examiner

Primary Examiner—John F. Niebling
Assistant Examiner—Stacy A Whitmore
(74) Attorney, Agent, or Firm—Clifton Anderson

(57) ABSTRACT

A multiprocessor system comprises a series of processors arranged to process data in an assembly-line fashion. Each processor includes an executor (execution unit, instruction decoder, and program counter) and a set of registers. Each set of registers is divided into two banks. At any given time, one bank is the "active" bank that is accessible by the local processor, and the other is the "shadow" bank, inaccessible to the local processor. Each processor but the last writes in parallel to its active bank and to the shadow bank of the immediate downstream processor. When all processors have completed working the data in their respective possession, a context-switch is performed switching register banks so that former active banks become shadow banks and former shadow banks become active banks. This makes data that was being processed by an upstream processor virtually immediately available to a local processor. This saves the latency that would be involved in transferring register data after the data is processed. Accordingly, system throughput is improved.

5 Claims, 4 Drawing Sheets

PIPELINED MULTIPROCESSING WITH UPSTREAM PROCESSOR CONCURRENTLY WRITING TO LOCAL REGISTER AND TO REGISTER OF DOWNSTREAM PROCESSOR

BACKGROUND OF THE INVENTION

The present invention relates to data processing and, more particularly, to multiprocessor data processing. A major objective of the invention is to provide for improved performance in a pipelined series of processors.

Much of modern progress is associated with advances in computer technology. A classical computer system includes a processor and memory. The memory includes memory storage locations, each with a unique memory address. The contents of the memory include data and instructions. The instructions constitute one or more computer programs according to which data is to be worked (manipulated). The processor reads the instructions from memory and executes them. According to the instructions executed, the processor reads data from memory, manipulates the data, and writes data to memory.

The processor itself can include an instruction decoder, an execution unit, a set of registers, and a program counter. The instruction decoder decodes instructions for execution by the execution unit. The execution unit uses the registers as a very small and very fast local memory, for example, to store coefficients, operands, partial results and final results for various operations called for by the instructions. The program counter is, in effect, a self-incrementing register so that, by default, instructions are fetched from memory in the order of the addresses of the memory locations at which they are stored. This default order can be changed as called for by various conditional and unconditional "jump" instructions.

The earliest processors had to complete execution of an instruction before the next instruction was fetched. Since an instruction fetch from memory is relatively time consuming, processors are usually designed with instruction buffers to hold instructions, e.g., at successive memory locations, likely to be used next. Still a delay would be involved where processing of one instruction had to wait until execution of the previous instruction was complete.

Pipelining, analogous to assembly lines in manufacturing, was introduced to minimize the latency between instruction executions. For example, in a two-stage pipeline, one instruction can be decoded while the previous instruction is being executed. Multi-stage pipelines break instruction execution into stages, with each stage processing a different instruction. The latency between instructions is reduced roughly in proportion to the number of stages in the pipelined.

Architectural advances such as pipelining, along with increasing circuit densities and clock speeds, have provided dramatic improvements in processor performance over the years. At any given level of processor development, further advances in performance could be achieve by using multiple processors. While parallel arrangements of processors are more widely known, serial arrangements of processors can be used to great advantage in many situations.

In a serial multiprocessor system, a first data set can be worked by a first processor. The data, as worked by the first processor, can then be worked by a second processor; in the meantime, a second data set can be worked by the first data processor. Then, the first data set can be worked by a third processor, the second data set worked by the second processor, and a third data set worked by the first processor. For example, the first processor performs error detection and correction, the second processor analyzes the data to determine what further processing should be performed, and the third processor performs the further processing. The data is thus pipelined through the series of processors to reduce the latency between data sets. In this case, the pipeline stages are not execution stages within a processor, but separate processors within the series.

The performance of a pipelined series of processors is adversely affected to the extent of any latency involved in transferring data from one processor to the next. If the transfer involves reading and writing to a common main memory, this latency can be quite large. The latency can be much reduced if some or all of the data can be transferred directly from the registers of the upstream processor to those of the downstream processor.

One limitation of this approach is that the memory capacity of a processor's register set is typically very small (so that access speeds can be high). For example, a typical processor might only be able to access sixteen 32-bit registers. (A processor might have a greater number of registers, but only be able access a limited number of these without switching operating modes.) Nonetheless, there are applications that involve sufficiently small data sets that all or most data that needs to be transferred can be transferred directly between processors. For example, once an upstream processor completes its processing of a data set, it can transfer the data from its registers to a downstream processor using "store" (or "store multiple") commands, while the downstream processor uses "load" (or "load multiple") commands to transfer the data into its registers.

Of course, there is still a latency involved in the inter-processor transfer of data. Even with such efficient instructions as "load multiple" and "store multiple", the latency measured in clock cycles will exceed the number of registers involved in the data transfer. What is needed is a pipelined serial processor system that minimizes this latency to provide for greater system throughput.

SUMMARY OF THE INVENTION

The present invention provides a multiprocessor system in which a processor performs writes concurrently to its active register bank and to a shadow register bank of a downstream processor. After processing of a first data set is completed, a context switch causes the former shadow register bank to become the active register bank for the downstream processor. Thus, the second processor can begin data manipulation of the first data set without an additional data transfer between register banks. In the meantime, the first processor can manipulate a second data set in accordance with a pipelining strategy. Thus, the latency associated with inter-processor data transfer is reduced since all or most of the transfer takes place during processing rather than after completion of processing.

The invention provides for two or more processors. Many applications would require that processors switch context in a coordinated fashion. To this end, the system can include global control logic. Each processor informs the global control logic when it has completed its processing of a current data set. This informing, for example, can involve processing a instruction to signal that the program is done. The global control logic determines when all processors are done and, when they are, can issue a context-switch command. In response to this command, all active and shadow register banks can switch roles.

The switch can be conceptualized as effected by 2×2 multiplexers. Write inputs to the multiplexer come from the local and upstream processors. The two write outputs are respectively directed to two register banks, one of which is the "active" register bank and the other of which is the "shadow" register bank at any given time. This multiplexer can be built into the register set (e.g., in the cases of registers with dual write ports) or be external. The multiplexer can be controlled directly by the global control logic or indirectly via the local processor. The active register bank is readable by the local processor without a context switch, while the shadow register is not readable by the local processor without a context switch.

In some cases, the data manipulation by an upstream processor may determine how the data is to be processed by a downstream processor. To this end, the processors are coupled so that a downstream processor can set its program counter in response to data received from an upstream processor. The program count represents the memory location of the next instruction to be fetched; setting the program count selects the program to be executed. Thus, the program to be executed can be selected based on the outcome of a data analysis by an upstream processor.

A major advantage of the invention is the reduction of the data transfer latency between pipeline stages. Instead of transferring data register by register after data processing is complete, the data is transferred during processing. After data processing, all that is required is a context switch. Such a switch can be effected in one clock cycle, as opposed to a number of clock cycles exceeding the number of registers involved in the data transfer. Another advantage of the invention is that the context switches can be coordinated among processors. In addition, program selection for a downstream processor can be conveniently selected by an upstream processor. These and other features and advantages of the invention are apparent from the description below with reference to the following drawings.

DESCRIPTION OF THE PREFERRED EMBODIMENTS

Figure 1:
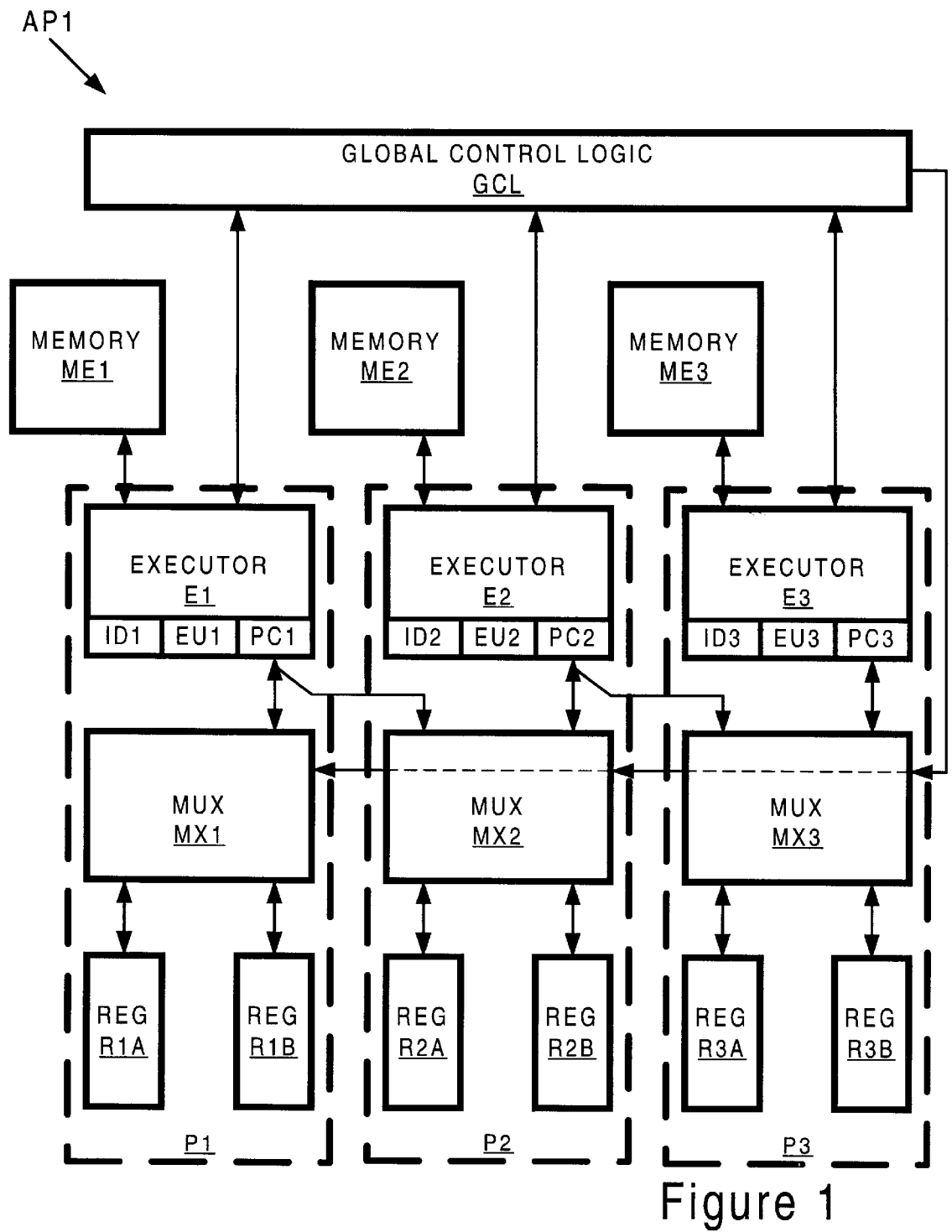
FIG. 1 is a block diagram of a multiprocessor system in accordance with the present invention.

A multiprocessor system AP1 comprises a series of processors P1, P2, and P3, respective memories ME1, ME2, ME3, and global control logic GCL. Each processor P1, P2, P3 includes a respective executor E1, E2, E3, a respective multiplexer MX1, MX2, MX3, and a respective register set RS1, RS2, RS3. Each register set RS1, RS2, RS3, includes a first register bank R1A, R2A, R3A, and a second register bank R1B, R2B, R3B. Each executor E1, E2, E3, includes a respective instruction decoder ID1, ID2, ID3, a respective execution unit EU1, EU2, EU3, and a respective program counter PC1, PC2, PC3.

Each memory ME1, ME2, ME3 contains data to be worked and programs of instructions for working the data. System AP1 is general purpose, so the data and instructions can be varied in many ways. By way of example, memory ME1 can include a program directed to error detection and correction; memory ME2 can include a program to perform a preliminary data analysis, as well as a program to handle cases in which errors detected in the previous stage cannot be corrected; and memory ME3 can include various programs that are selected as a function of the result of the analysis performed by the analysis program stored in memory ME2.

Processors P1, P2, and P3 are structurally identical. Accordingly, the following detailed description of processor P1 serves also as a description of processors P1 and P3. Differences between the processors due to their different series positions as first (P1), intermediate (P2), and last (P3) are also indicated below.

Executor E2 of processor P2 is coupled to memory ME2 for reading instructions and data therefrom and for writing data thereto. More specifically, executor E2 reads the instruction stored at the memory location indicated in program counter PC2. By default, program counter PC2 increments, but can jump to a non-sequential memory address using various conditional and unconditional jump instructions.

Executor E2 is also coupled to register set RS2 through multiplexer MX2. Executor E2 is coupled to only one of register banks R2A and R2B at any given time according to the setting of multiplexer MX2. Herein, the bank of a local register set to which a processor is coupled is referred to as the "active" bank, and the other local bank is referred to as the "shadow" bank. Selection of either bank R21 or R22 as the active bank is made by global control logic GCL, which controls all three multiplexers MX1–MX3 concurrently.

Multiplexer MX2 is a 2×2 multiplexer. In the case of a register write operation, multiplexer MX2 has two write inputs and two write outputs. The write outputs are coupled to respective register banks R2A and R2B. One write input is coupled to local executor E2, while the other write input is coupled to upstream executor E1. Thus, upstream executor E1 is coupled to the current shadow register bank of register set RS2. Accordingly, the contents of the local shadow register bank mirrors the contents of the upstream active register bank. Local executor E2 can read from the respective local active bank (via first and second operand paths).

Executor E2 is coupled to global control logic GCL for indicating when the program being executed by executor E2 is "done". This indication is provided in response to a "signal program done" instruction to that effect. Global control logic GCL is also coupled to processors P1 and P3 to the same end. When "done" indications are received from all three processors P1, P2, and P3, global control logic GCL issues a context-switch command to multiplexers MX1–MX3. Thus, all three multiplexers MX1, MX2, and MX3 are switched concurrently.

As indicated above, processors P1 and P3 are essentially identical to processor P2. However, since processor P1 is the first in the series, multiplexer MX1 is not coupled to an upstream executor. Likewise, since processor P3 is the last in the series, executor E3 is not coupled to a downstream multiplexer.

Figure 2:
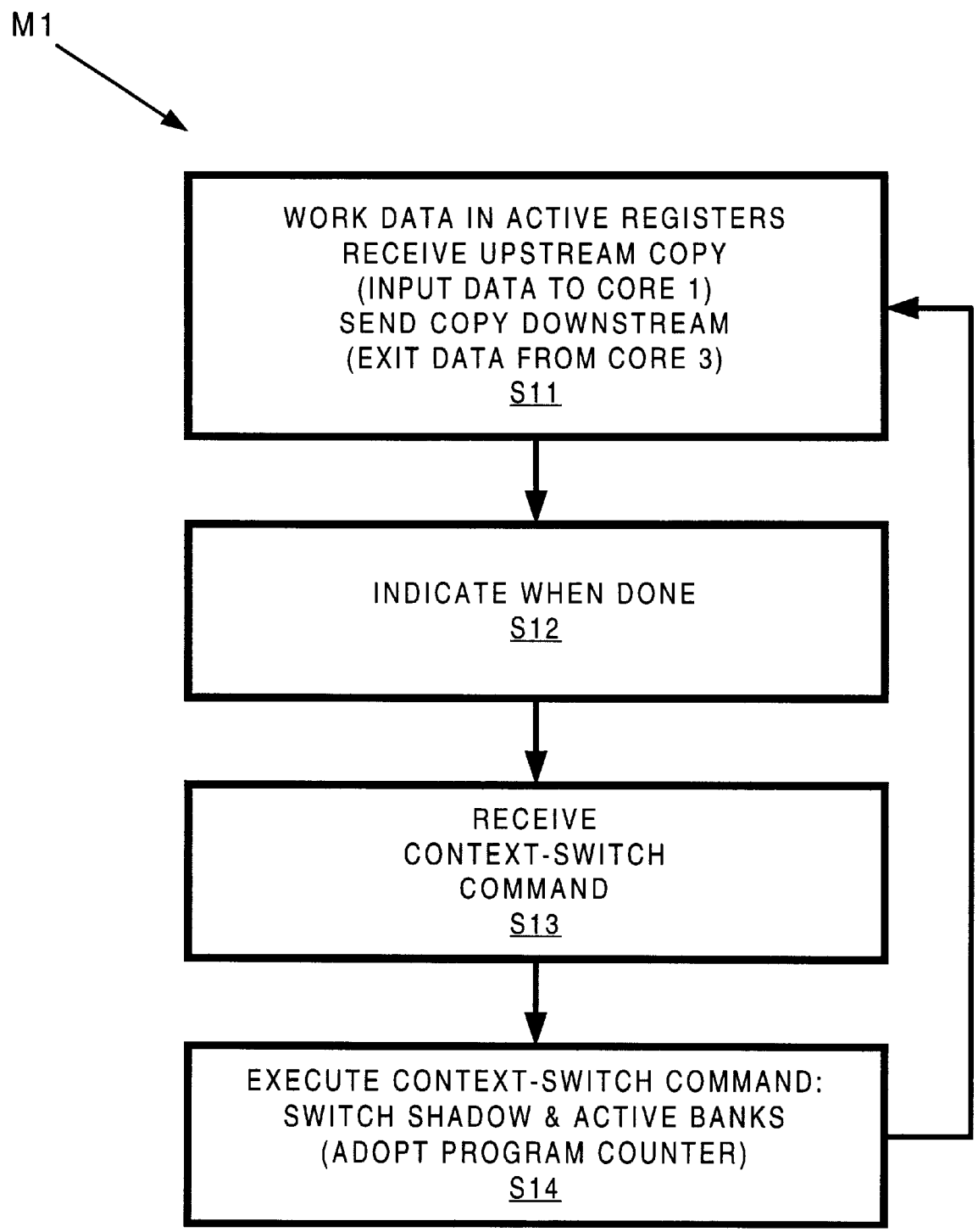
FIG. 2 is a flow chart of a method of the invention practiced in the context of the system of FIG. 1.

A method M1 practiced in the context of system AP1 in accordance with the present invention is flow charted in FIG. 2. This flow chart focuses on the perspective of intermediate processor P2, since it is both downstream (relative to processor P1) and upstream (relative to processor P3). Accordingly, method M1 is shown with a first step S11 of working data. This involves reading data from the active bank (e.g., R2A) of register set RS2, writing to the active bank (e.g., bank R1A) of local register set RS2, and copying (writing forward) to the shadow bank (e.g., R3B) of downstream register set RS3. Concurrently, processor P1 forwards a copy of data it is writing to its active bank (e.g., R1A) to the shadow bank (e.g., R2B) of processor P2. From the perspective of processors P1 and P3, step S11 also encompasses the inputting data to processor P1, e.g., as data processing begins, and outputting data from processor P3, e.g., as data processing ends.

Once it completes its processing of the current data set, processor P2 indicates to global control logic GCL that it is "done" at step S12. Processors P1 and P3 also provide "program done" indications in the same time frame, although not, in general, at the same time. Once global control logic GCL receives "done" indications from all three processors, it issues a context-switch command, which is received by all three processors at step S13.

All three processors (or, more specifically, their multiplexers) execute the context switch command at step S14. This execution involves switching the bank (e.g., R2A) that was active during previous step S11 so that it becomes the shadow bank, and switching the bank (e.g., R2B) that was "in the shadow" in step S11 so that it becomes the active bank. If the upstream processor has provided a program counter value, it is adopted by the local processor at step S14.

Once the context switch is complete, method M1 returns to step S11. In this next iteration of step S11, the data set worked by the local processor moves to the downstream processor, and the local processor processes the next data set in the series.

Figure 3:
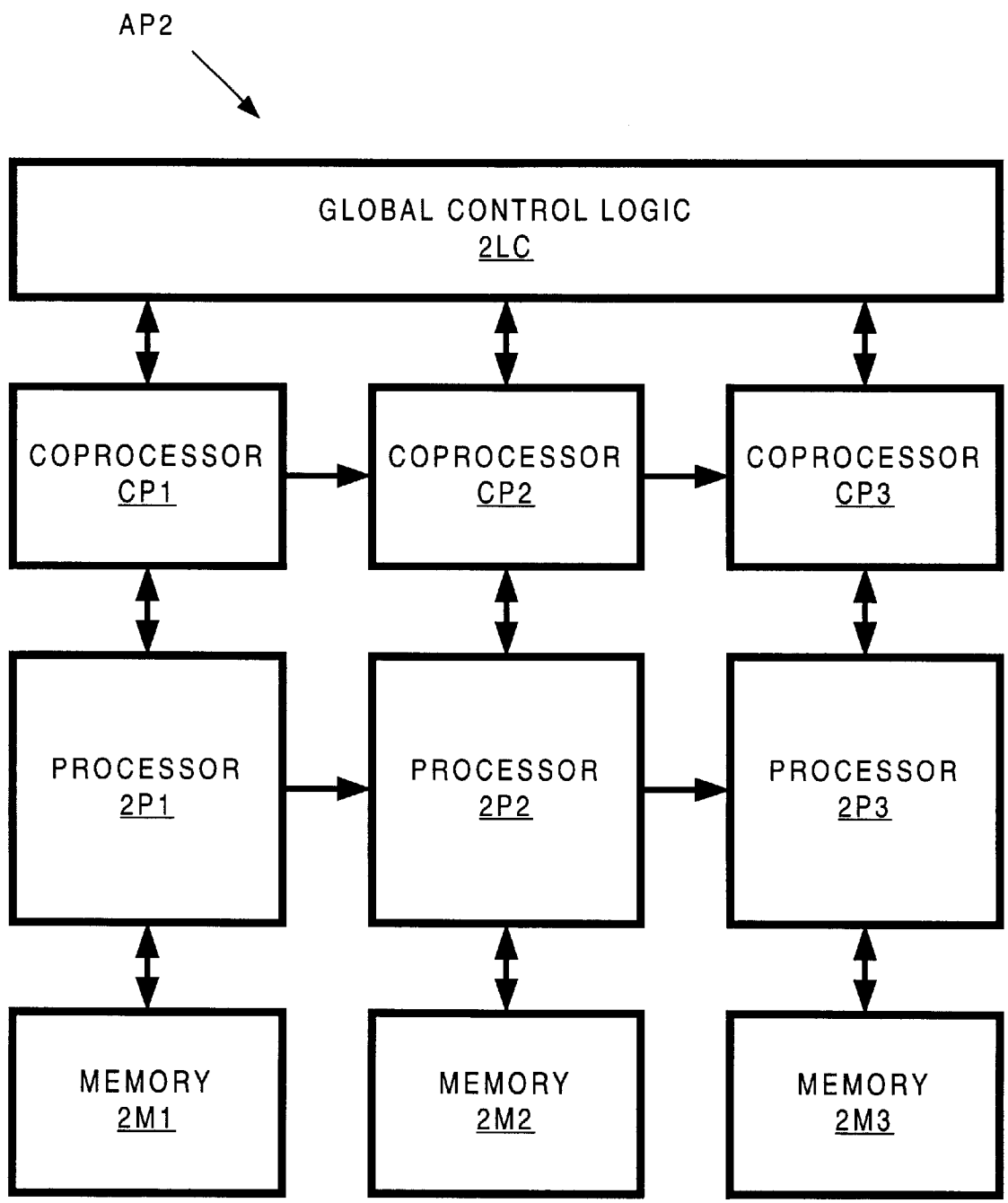
FIG. 3 is a block diagram of a second multiprocessor system in accordance with the present invention.

System AP1 is an example of a system designed from the ground up to take advantage of the present invention. For many reasons, including compatibility with established processor architectures, it can be necessary to "retrofit" an existing processor design with the present invention. System AP2, as shown in FIG. 3, is an example of a system based on the Arm 7TDMI processor, available from VLSI Technology, San Jose, Calif.

System AP2 comprises processors 2P1, 2P2, 2P3 arranged in a linear array. Associated with each processor is a respective local memory 2M1, 2M2, 2M3, and a coprocessor CP1, CP2, CP3. Global control logic 2CL coordinates the actions of the respective pairs of processors and coprocessors.

System AP2 differs from system AP1 primarily in the presence of coprocessors CP1, CP2, and CP3. The core ARM processors do not provide directly for some of the instructions called for by the present invention. For example, the native ARM instruction set does not provide a "done" signal in response to an instruction to do so. The ARM does recognize a set of coprocessor instructions that it leaves for a coprocessor to execute. In this case, the coprocessors provide the "program done" signals in response to a coprocessor instruction, e.g., at the end of a program, to do so.

The coprocessors are also used to manage transfer of a program counter selected by an upstream processor. The upstream processor transfers the desired count to the local coprocessor. The local coprocessor holds the count until it can be transferred to the program counter of the local processor during the next context switch.

The memory connections are depicted in simplified form in FIG. 3. Each memory is coupled both to the respective processor and the respective coprocessor. Thus, memory 2M2 is coupled to both processor 2P2 and coprocessor CP2. In this way, both the processor and the coprocessor receive all instructions to enable speculative execution.

The processors are coupled as shown in FIG. 3. Each upstream processor (e.g., 2P1) provides to the local processor (e.g., 2P2) a write enable signal, a four-bit address (for sixteen total registers), and a 32-bit data word. Each upstream coprocessor (e.g., CP1) provides to the local coprocessor (e.g., CP2) a 15-bit program count and a write enable signal to indicate when the asserted program count is valid. Each coprocessor (e.g., CP2) is coupled to its respective processor (e.g., 2P2) for receiving a "done" or "CP control" signal therefrom and for providing the count data and a count write signal thereto.

The standard ARM7TDMI has several operating modes including User32, Fast IRQ (FIQ), Supervisor, IRQ, Abort, and Undefined Instruction. In each mode, the processor can access sixteen registers. In system AP2, context-switches are between supervisor mode and FIQ mode. These modes share registers R0–R7, so these registers are not switched. Register R15 is the program counter and is also not switched. Registers fiq8–fiql4 are switched with registers R8–R12, svcR13, and svcR14). This illustrates an optional feature of the invention: switching some registers while leaving some unswitched.

Figure 4:
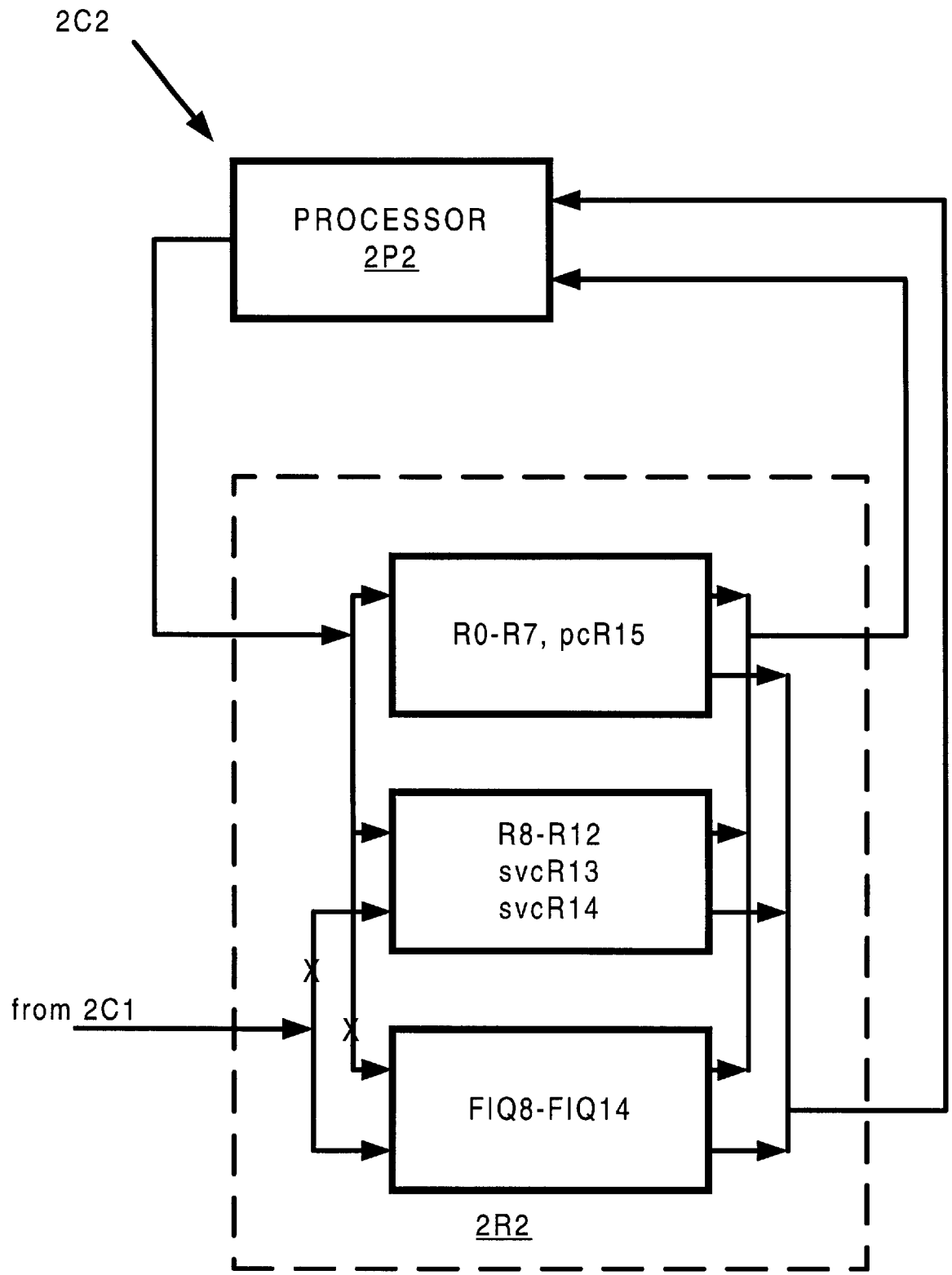
FIG. 4 is a block diagram of a processor of the multiprocessor system of FIG. 3.

This situation is depicted in FIG. 4 with respect to processor 2P2 and its main processor 2P2 and its register set 2R2. In FIG. 4, the write ports are shown on the left of the register banks, while the read ports are shown to the right. As indicated by the Xs on input lines, only one write port is enabled for each of the switched register banks. For one of the switched register banks, the local write port is enabled, while for the other, the upstream write port is enabled. Functionally, the dual write ports correspond to built-in multiplexers corresponding to MX1–MX3 of system AP1. The dual read ports are used to present first and second operands to processor 2P2 for two-operand operations.

The present invention provides for many alternatives to the embodiments detailed above. Processors can have dedicated local memory, memory common to all processors, or both. Preferably, data originally input to an upstream register set is copied to a downstream register set. However, in cases where only modified data is copied, provisions must be made for unmodified data to be copied at some point. For example, register flags can be used to indicate (with "dirty bits") modified data. Once all data modifications have been completed, unmodified data can be transferred using, for example, load-store commands. Alternatively, unmodified data can be transferred during unused write cycles of the upstream processor.

The invention provides for pipelines as short as two processors, and imposes no maximum number of processors. Multiple pipelines can be used in parallel to increase throughput. The invention is not limited to two register banks per processor. Other variations upon and modifications to the described embodiments are provided for by the present invention, the scope of which is limited only by the following claims.

What is claimed is:

1. A computer system memory for storing data and programs of instructions;

a downstream processor for manipulating said data in accordance with said instructions, said downstream processor being coupled to said memory for fetching said instructions and for reading data therefrom and writing data thereto, said downstream processor having a downstream register set including a first bank and a second bank, said downstream processor reading from and writing to an active one of said first bank and said second bank;

a bank selector for determining which one of said first and second banks is the active bank and which is not the active bank;

an upstream processor for manipulating said data in accordance with said instructions, said upstream processor being coupled to said memory for fetching said instructions and for reading data therefrom and writing data thereto, said upstream processor having an upstream register set, said upstream processor reading data from said upstream register set, said upstream processor concurrently writing to said upstream register set and the one of said first and second banks of said downstream processor that is not the active bank; and control logic for receiving program-done indications from said upstream and downstream processors, said control logic issuing a context-switch command to said bank selector at least in part as a function of said program-done indications;

wherein said upstream register set includes a third bank of registers and a fourth bank of registers, said bank selector changing which one of said first and second banks is the active bank for said second processor and which one of said third and fourth banks is the active bank for said first processor in response to said context-switch command.

2. A computer system as recited in claim 1 wherein said downstream processor is coupled to said upstream processor for receiving a program count therefrom, said downstream processor having a program counter into which said program count is stored.

3. A computer system as recited in claim 2 wherein said downstream processor stores said program count in said program counter in response to said context switch command, said downstream processor being coupled to said control logic for receiving said context-switch command therefrom.

4. A computer system comprising:

memory for storing data and programs of instructions;

a downstream processor for manipulating said data in accordance with said instructions, said downstream processor being coupled to said memory for fetching said instructions and for reading data therefrom and writing data thereto, said downstream processor having a downstream register set including a first bank and a second bank, said downstream processor reading from and writing to an active one of said first bank and said second bank;

a bank selector for determining which one of said first and second banks is the active bank and which is not the active bank;

an upstream processor for manipulating said data in accordance with said instructions, said upstream processor being coupled to said memory for fetching said instructions and for reading data therefrom and writing data thereto, said upstream processor having an upstream register set, said upstream processor reading data from said upstream register set, said upstream processor concurrently writing to said upstream register set and the one of said first and second banks of said downstream processor that is not the active bank; and a third processor having a third register set including a third bank and a fourth bank, said bank selector alternatively concurrently selecting either said first and said fourth banks as active banks, or concurrently selecting said second and said third bank as said active banks, said downstream processor concurrently writing to the active one of said first and second banks and the inactive one of said third and fourth banks.

5. A method of processing data comprising the steps of:

working a first data set using a first processor, said first processor reading from a first register set associated with said first processor and concurrently writing to said first register set and to a second register bank associated with a second processor;

then executing a first context-switch command;

then working said first data set using said second processor, said second processor reading from and writing to said first register bank; and then executing a second context-switch command so that the contexts of said first and second processors are concurrently switched, and then working said first data set using a third processor by reading and writing to a third register bank, said second processor writing to said third register bank during said step of working said first data set using said second processor.

* * * * *